United States Patent [19]
Mizoguchi et al.

[11] Patent Number: 5,566,364
[45] Date of Patent: Oct. 15, 1996

[54] POWER SAVING PORTABLE RADIO COMMUNICATION DEVICE WITH DIVERSITY RECEPTION

[75] Inventors: Tamiyuki Mizoguchi, Tokyo; Motoyoshi Hasegawa, Saitama, both of Japan

[73] Assignee: NEC Corporation, Japan

[21] Appl. No.: 379,210

[22] Filed: Jan. 27, 1995

[30] Foreign Application Priority Data

Jan. 31, 1994 [JP] Japan .................................. 6-009647

[51] Int. Cl.⁶ .................................................. H04B 17/02
[52] U.S. Cl. .......................... 455/132; 455/134; 455/135; 455/272; 455/277.1; 375/347
[58] Field of Search ............................. 455/132, 133, 455/134, 140, 161.3, 231, 233.1, 277.1, 277.2, 278.1, 343, 135, 136, 272, 38.3; 375/347

[56] References Cited

U.S. PATENT DOCUMENTS

| | | | |
|---|---|---|---|
| 4,479,261 | 10/1984 | Oda et al. | 455/343 |
| 4,823,398 | 4/1989 | Hashimoto | 455/134 |
| 5,274,843 | 12/1993 | Murai et al. | 455/38.3 |
| 5,390,357 | 2/1995 | Nobusawa et al. | 455/134 |

FOREIGN PATENT DOCUMENTS 63-33021  2/1988  Japan .

*Primary Examiner*—Reinhard J. Eisenzopf
*Assistant Examiner*—Lee Nguyen
*Attorney, Agent, or Firm*—Whitham, Curtis, Whitham & McGinn

[57] ABSTRACT

Electric field intensity of a signal corresponding to a plurality of receivers and received through antennas are converted into direct currents. The converted direct currents thus converted are fed to an electric field level detection circuit. The electric field level detection circuit detects the electric field level on the basis of the direct currents of respective receivers and feeds a detection signal to a control portion. The control portion compares the electric field level corresponding to the direct current value in said controller with a predetermined electric field level to make judgement that the received electric field is a strong electric field and stable. Then, a command is issued to keep one of the receivers, at which the higher electric field level is detected and to turn off other receiver. An electric power source control portion performs switching of the switch portions corresponding to respective of the receivers to supply only one of the receiver from a power source and to block power supply from the power source to other receivers.

12 Claims, 4 Drawing Sheets

POWER SAVING PORTABLE RADIO COMMUNICATION DEVICE WITH DIVERSITY RECEPTION

BACKGROUND OF THE INVENTION

1. Field of the Invention

The present invention relates generally to a portable radio communication system. More specifically, the invention relates to a diversity type portable radio communication device which has a dual receiver system.

2. Description of the Related Art

In the conventional portable radio communication system, diversity reception by a dual receiver system is performed for compensating phasing in mobile communication. In such dual receiver system, electric field level is detected by respective of two receivers in the dual receiver system and converted into direct currents so as to compare the received electric field levels for selecting one of the receivers having higher received electric field level for receiving data.

Accordingly, in this construction, the portable radio communication device is operable by maintaining power supply for both of the receivers even under a condition where electric field intensity is stable.

FIG. 4 shows one typical example of the conventional portable radio communication device. As shown, the dual receiver system comprises two receivers 3 and 4, antennas 1 and 2 respectively connected to a corresponding one of the receivers. A field level detector circuit 5, a control portion 6 and power source portion 8 supply power to the receivers 3 and 4.

The receivers 3 and 4 convert electric field intensity of a signal received through the antennas 1 and 2 into direct currents having direct current values 11 and 12. The direct current values 11 and 12 are output to the electric field level detector circuit 5. The electric field level detector circuit 5 detects the electric field levels of respective of the receivers 3 and 4 on the basis of the direct current values 11 and 12 to output a detection signal 19 to the control portion 6.

The control portion 6 performs comparison of the electric field levels corresponding to the direct current values 11 and 12 by the detection signal 19. On the basis of the result of comparison, the control portion 6 selects one of the receivers 3 and 4 having higher electric field level. Then, the control portion 6 switches reception channel to the selected one of the receivers 3 and 4 to receive data therethrough. It should be noted that the power source 8 constantly supplies electric power 15 and 16 to both of the receivers 3 and 4 for enabling them.

Therefore, even when the control portion 6 compares the electric field levels corresponding to the direct current values 11 and 12 with a preliminarily set electric field level and makes judgement that the received electric field is a stable and strong electric field, the electric power 15 and 16 is supplied to the receivers 3 and 4 from the power source 8.

As set forth above, in the conventional portable radio communication device, the electric field levels detected by respective of two receivers in the dual receiver system are converted into the direct current values, the direct current values are compared with each other so that one having higher electric field level is selected for obtaining received data.

Therefore, even in the stable state where the electric field is strong and thus no drop of the electric field occurs, it is inherent to keep both receivers ON. Therefore, unnecessary power consumption is inevitable.

Another type of diversity type portable radio communication device has been disclosed in Japanese Unexamined Patent Publication (Kokai) No. Showa 63-33021, for "Portable Radio Communication Device". In the disclosed portable radio communication device, in order to provide a battery saving function is provided for the device, in the portable radio communication device which can have two stand-by modes, i.e. an in-area stand-by mode which is normal stand-by mode within a service area and an out-area stand-by mode which is a stand-by mode out of the service area, a detection circuit is provided for determining whether the portable radio communication device is present within or out of the service area, and a battery saving circuit for periodically supplying power to the respective receivers at given intervals when judgement is made in the out-area stand-by mode and constantly supplying power to both receivers in the in-area stand-by mode.

As can be appreciated, the shown portable radio communication device determines whether the device itself is present within the service area or not so that the power is supplied to the receivers periodically and alternately in the out-area stand-by mode. As set forth, since the diversity type portable radio communication device requires that both receivers are kept ON, the system disclosed in the above-mentioned publication is not applicable for the diversity type device.

SUMMARY OF THE INVENTION

Therefore, it is an object of the present invention to provide a portable radio communication device having capability of diversity reception, which can reduce power consumption.

According to one aspect of the invention, a portable radio communication device having a multi-receiver system and being capable of diversity reception comprises:

electric field detection means for detecting reception input electric field intensity of respective receivers in the multi-receiver system; and control means for monitoring electric field level detected by the electric field level detection means and controlling power supply for respective receivers in the multi-receiver system depending upon the results of monitoring.

According to another aspect of the invention portable radio communication device, having a multi-receiver system and being capable of diversity reception comprises:

a plurality of switch portions for turning ON and OFF the power supply for respective ones of a plurality of receivers in the multi-receiver system;

an electric field level detection circuit detecting received electric field level on the basis of direct current values indicative of received input electric field intensities of respective receivers in the multi-receiver system;

control portion for selecting one of the receivers at which the highest electric field level is detected when judgement is made that the received electric field intensity is high and stable; and a power source control portion for controlling the switch portions to turn ON and OFF depending upon the result of judgement by the control portion.

According to a further aspect of the invention, a portable radio communication device having a multi-receiver system and being capable of diversity reception comprises:

electric field level detecting means for detecting received input electric field intensity of respective receivers in the multi-receiver system;

monitoring means for monitoring electric field level detected by the electric field level detecting means and;

control means for controlling ON and OFF of power supply for respective receivers on the basis of the result of monitoring by the monitoring means.

BRIEF DESCRIPTION OF THE DRAWINGS

The present invention will be understood more fully from the detailed description given herebelow and from the accompanying drawings of the preferred embodiment of the invention, which, however, should not be taken to be limitative to the present invention, but are for explanation and understanding only.

In the drawings.

DESCRIPTION OF THE PREFERRED EMBODIMENT

The present invention will be discussed hereinafter in detail with reference to the accompanying drawings, particularly to FIGS. 1 to 3. In the following description, numerous specific details are set forth in order to provide a thorough understanding of the present invention. It will be obvious, however, to those skilled in the art that the present invention may be practiced without these specific details. In other instance, well-known structures are not shown in detail in order to not unnecessary obscure the present invention.

Figure 1:
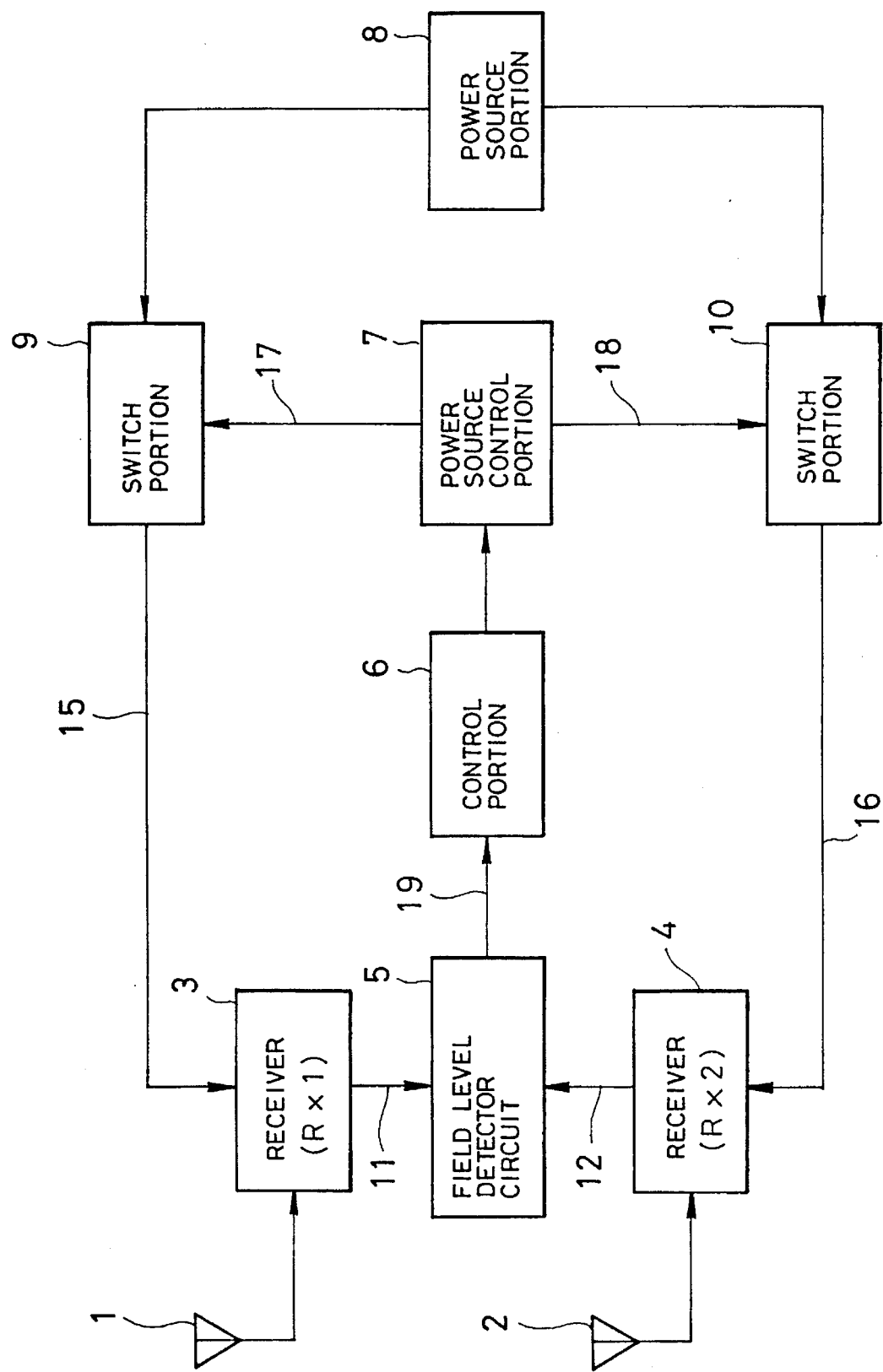
FIG. 1 is a block diagram showing one embodiment of a portable radio communication device according to the present invention.
Figure 4:
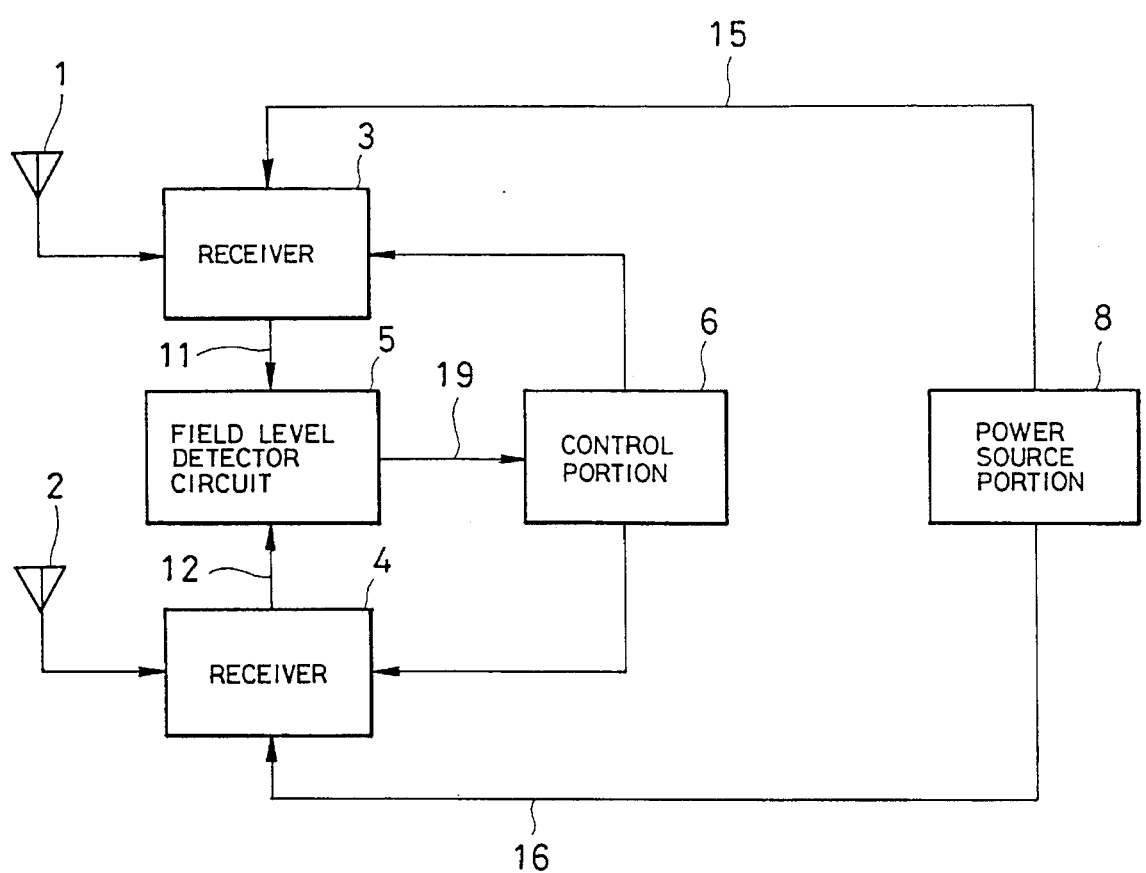
FIG. 4 is a block diagram showing one example of conventional portable radio communication device.

In FIG. 1, the preferred embodiment of a portable radio communication device is capable of diversity reception with a dual receiver system of two receivers 3 and 4. The device is constructed by adding a power source control portion 7 and switch portions 9 and 10 for turning ON and OFF power supply for the receivers 3 and 4 from the power source 8, to the construction of the conventional device in FIG. 4. It should be noted that like reference numerals show like elements in the prior art illustrated in FIG. 4.

Subsequently, the operation of the shown embodiment will be discussed. Normally, the power source control portion 7 maintains the switch portions 9 and 10 in ON state by switching control signal 17 and 18 to supply power 15 and 16 to respective receivers 3 and 4 from the power source 8. Therefore, in the normal state, both of the receivers 3 and 4 are operative for receiving radio signal.

At this condition, the receivers 3 and 4 convert the electric field of the signal received through the antennas 1 and 2 into direct current values 11 and 12. The direct current values 11 and 12 are output to the electric field level detector circuit 5. The electric field level detector circuit 5 detects the electric field level respective of the receivers 3 and 4 on the bas is of the direct current values 11 and 12 and feed a detection signal 19 to the control portion 6.

The control portion 6 performs comparison of the electric field levels corresponding to the direct current values 11 and 12 by the detection signal 19 from the electric field level detector circuit 5. Based on the result of this comparison, switching is performed for select one of the receivers 3 and 4 having higher electric field to obtain reception data.

The control portion 6 further compares the electric field levels corresponding to the direct current values 11 and 12 with a predetermined electric field level. When the electric field levels corresponding to the direct current values 11 and 12 are held higher than the predetermined electric field level for a given period, then, the control portion 6 makes judgement that the receiving electric field is strong electric field and stable. In this case, the control portion 6 maintains one of the receivers 3 and 4 having higher received electric field level in active state and terminates power supply for the other receiver for turning OFF.

For instance, when the control portion 6 makes judgement that the receiver 3 is the receiver more stable than the receiver 4, the power source control portions 7 controls the switch 9 to maintain power supply for the receiver 3 and controls the switch 10 to terminate power supply for the receiver 4.

Namely, the power source control portion 7 is responsive to a command from the control portion 6 to turn the switch portion 10 OFF by the switching signal 18 with maintaining the switch portion 9 in ON state. Accordingly, while the power 15 is supplied to the receiver 3 from the power source portion 8 to the receiver 3 via the switch portion 9, power supply for the receiver 4 is terminated by turning OFF of the switch portion 10.

Even in the state where the power supply for one receiver 4 is stopped, the received electric field level of the receiver 3 while is maintained in active state by maintaining power supply 15 is constantly monitored by the electric field level detector circuit 5. When the received electric field intensity in the receiver drops or when the electric field becomes unstable due to drop of the detected electric field level or other reason, the control portion 6 feeds a command to the power source control portion 7 to resume power supply for the receiver 4 by turning ON the switch 10 by the switching control signal 18. Thus, diversity reception can be resumed.

It should be noted that while the foregoing embodiment has been discussed in terms of the portable radio communication device having the dual receivers, the present invention should not be specified but can be with any arbitrary number. Also, the switch portions are not specified to be an electronic switch but can be of any type of switch. Furthermore, the switch portion may also be constructed with a relay.

Figure 2:
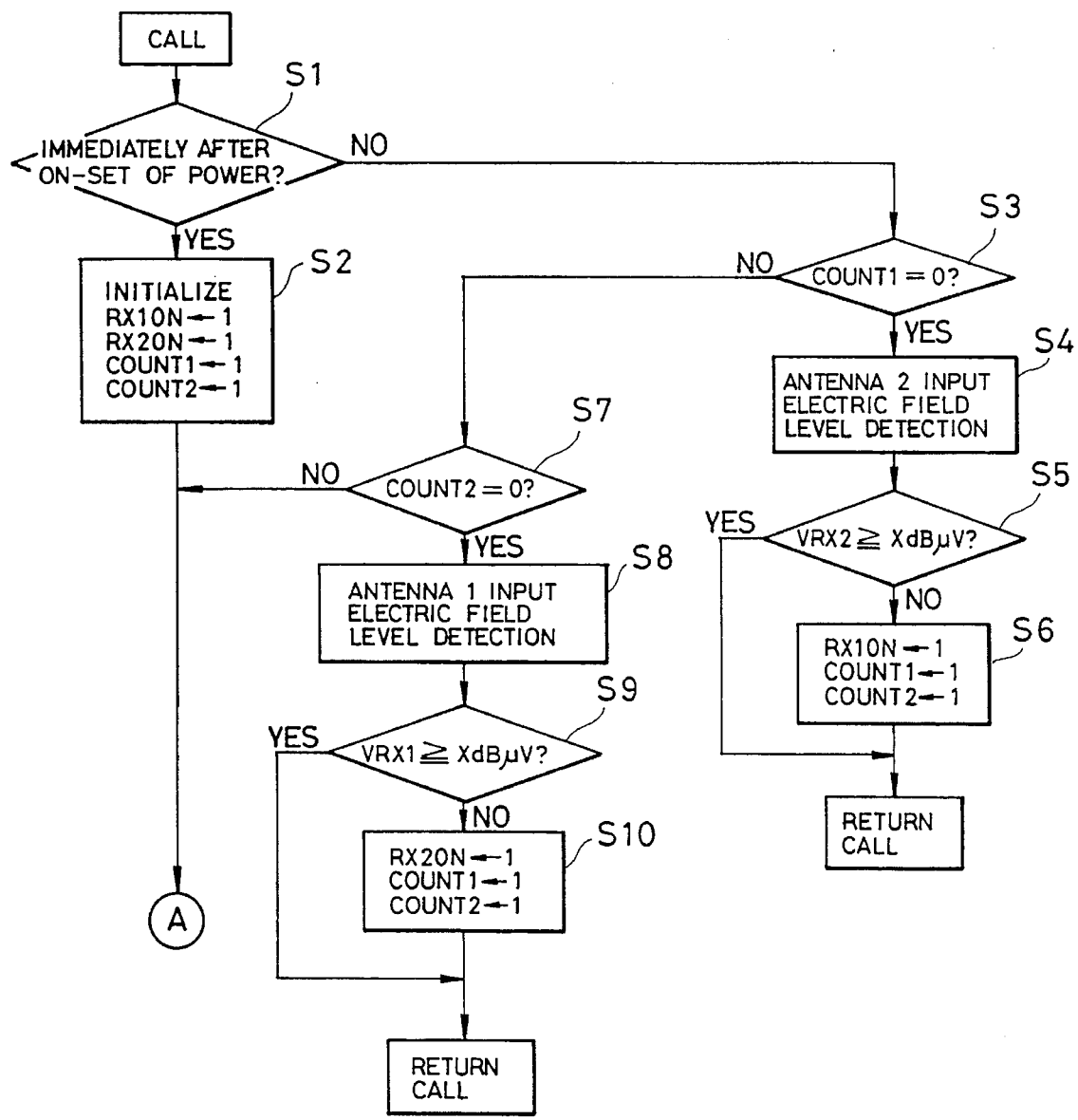
FIG. 2 is a flowchart showing operation of a control portion in FIG. 1.
Figure 3:
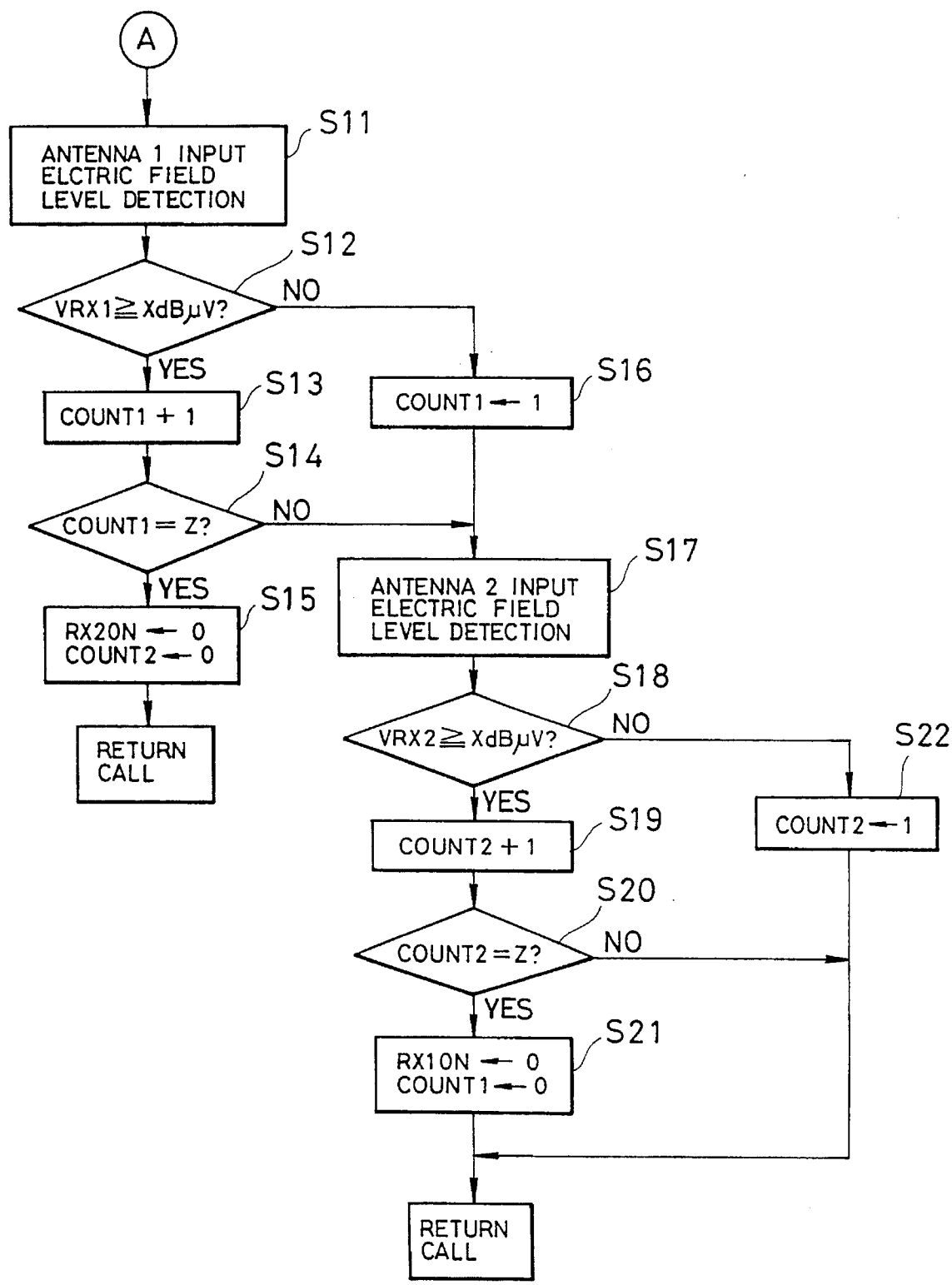
FIG. 3 is a flowchart showing operation of the control portion and a power source control portion in FIG. 1.

FIGS. 2 and 3 are flowcharts showing operation of the control portion 6 in the circuit illustrated in FIG. 1. The operation of the shown embodiment of the portable radio communication device according to the present invention will be discussed hereinafter with reference to FIGS. 1 to 3.

When the control portion 6 initiates process, at first, a check is made as to whether the current timing is immediately after on-set of power supply (step S1 of FIG. 2). When the timing is immediately after on-set of power supply and thus the answer at the step S1 is positive, the control portion 6 performs initialization process (step S2 of FIG. 2). In the initialization process, the control portion 6 commands to the power source control portion 7 to turn ON respective switch portions 9 and 10 (RX1ON←1, RX2ON←1). In conjunction therewith, the control portion 6 sets an antenna 1 input electric field monitoring counter and an antenna 2 input electric field monitoring counter (not shown) to "1" (COUNT←1, COUNT2←1).

After initialization, the control portion 6 detects the antenna 1 input electric field level $V_{RX1}$ (step S11 of FIG. 3) and checks whether the detected antenna 1 input electric field level $V_{RX1}$ is higher than the predetermined electric field level $X_{dB\mu V}$ ($V_{RX1} \geq X_{dB\mu V}$) (step S12 of FIG. 3.) Here, $V_{RX1}$ is an antenna input electric field level opening end voltage (dBµV) and XdBµV is an input electric field threshold level for making judgement of stable electric field.

The control portion 6 increments the value of the antenna 1 input electric field level is monitoring counter (Count1+1) when judgement made that the input electric field level $V_{RX1}$ is higher than the threshold value $X_{dB\mu V}$ (step S13 of FIG. 3). Subsequently, check is performed whether the value of the antenna 1 input electric field level monitoring counter becomes Z (Count1=Z) (step S14 of FIG. 3). Here, Z is a predetermined period for making judgement of stable electric field.

When judgement is made that the value of the antenna 1 input electric field level counter reaches Z, the control portion 6 commands to the power source control portion 7 to turn OFF the switch portion 10 (RX2ON←0) and resets "0" to the antenna 2 input electric field monitoring counter (step SC of FIG. 3). Thereafter, the process returns to the step S1.

On the other hand, when the control portion makes judgement that the antenna 1 input electric field level $V_{RX1}$ is not higher than the threshold level $X_{dB\mu V}$ as checked at the step S12, the control portion 6 sets "1" to the antenna 1 input electric field level monitoring counter (Count1←1) (step S16 of FIG. 3).

When "1" is set in the antenna 1 input electric field 1 even monitoring counter or when the value of the antenna 1 input electric field level monitoring counter has not reached Z, the control portion 6 detects an antenna 2 input electric field level (step S17 of FIG. 3) and determines whether the detected antenna 2 input electric field level is higher than the threshold value $X_{dB\mu V}$ ($V_{RX2} \geq X_{dB\mu V}$) (step S18 of FIG. 3). It should be noted that $V_{RX2}$ is the antenna 2 input electric field level opening end voltage (dBµV).

When judgement is made that the antenna 2 input electric field level $V_{RX2}$ is higher than or equal to the threshold level $X_{dB\mu V}$, a value of an antenna 2 input electric field level monitoring counter is incremented by "1" (COUNT2+1) (step S19 of FIG. 3). Thereafter, a check is performed to determine whether the value of the antenna 2 input electric field level monitoring counter reaches Z or not (COUNT2=Z) (step S20 of FIG. 3).

When judgement is made that the value of the antenna 2 input electric field level monitoring counter reaches Z, the control portion 6 commands to the power source control portion 7 to turn OFF the switch 9 to disable receiver 3 (RX1ON←0), and in conjunction therewith, "0" is set to the antenna 1 input electric field level monitoring counter (Count1←0) (step S21 of FIG. 3). Thereafter, the process returns to the step S1.

On the other hand, when the antenna 2 input electric field level $V_{RX2}$ is not higher than or equal to the threshold level $X_{dB\mu V}$ as checked at the step S18, the control portion 6 sets "1" to the antenna 2 input electric field level monitoring counter (COUNT2←1) (step S22 of FIG. 3). Thereafter, the process returns to the step S1. Also, when judgement in the step 22 of FIG. 3 is made that the value of the antenna 2 input electric field level monitoring counter does not reach Z, the process returns to the step S1.

On the other hand, when the judgement is made that the timing is not immediately after on-set of power supply, the control portion 6 checks whether the value of the antenna 1 input electric field level monitoring counter is "0" or not (step S3 of FIG. 2).

When judgement is made that the value of the antenna 1 input electric field level monitoring counter is "0" as checked at the step S3, the control portion 6 detects the antenna 2 input electric field level (step S4 of FIG. 2) and makes judgement if the antenna 2 input electric field level $V_{RX2}$ is higher than or equal to the threshold level $X_{dB\mu V}$ ($V_{RX2} \geq X_{dB\mu V}$) (step S5 of FIG. 2).

When judgement is made that the value of the antenna 2 input electric field level $V_{RX2}$ is not higher than or equal to $X_{dB\mu V}$, the control portion 6 commands to the power source control portion 7 to turn ON the switch portion 9 (RX1ON←1), and in conjunction therewith, sets "1" to the antenna 1 input electric field level monitoring counter and the antenna 2 input electric field level monitoring counter (Count1←7 and COUNT2←1) (step S6 of FIG. 2). Thereafter, the process returns to the step S1. Also, when the control portion 6 makes judgement that the antenna 2 input electric field level $V_{RX2}$ is higher than or equal to $X_{dB\mu V}$, the process returns to the step S1.

On the other hand, when judgement is made that the value of the antenna 1 input electric field level monitoring counter is not "0" as checked at the step S3, the value of the antenna 2 input electric field level monitoring counter checked if the value is "0" (COUNT2=0) (step S7 of FIG. 2). When judgement is made that the value of the antenna 2 input electric field level monitoring counter is not "0", the process is advanced to the step S11.

On the other hand, when judgement is made that the value of the antenna 2 input electric field level monitoring counter is not "0", the antenna 1 input electric field level is detected (step S8 of FIG. 2) and checks whether the detected antenna 1 input electric field level $V_{RX1}$ is higher then or equal to the threshold level $X_{dB\mu V}$ ($V_{RX1} \geq X_{dB\mu V}$) (step S9 of FIG. 2).

When judgement is made that the value of the antenna 1 input electric field level $V_{RX1}$ is not higher than or equal to $X_{dB\mu V}$, the control portion 6 commands to the power source control portion 7 to turn ON the switch portion 10 (RX2ON←1), and in conjunction therewith, sets "1" to the antenna 1 input electric field level monitoring counter and the antenna 2 input electric field level monitoring counter (Count1←1 and COUNT2←2) (step S10 of FIG. 2). Thereafter the process returns to the step S1. Also, when the control portion 6 makes judgement that the antenna 2 input electric field level $V_{RX2}$ is higher than or equal to $X_{dB\mu V}$, the process returns to the step S1.

As set forth above, according to the present invention, in the portable radio communication device having a multi-receiver system capable of diversity reception, the electric field levels of respective receivers 3 and 4 are detected by the electric field level detector circuit 5 on the basis of the direct current values 11 and 12 converted by respective of the receivers 3 and 4 in the multi-receiver system, the electric field level detected by the electric field level detector circuit 5 is constantly monitored by the control portion 6 so as to turn ON and OFF the switch portions 9 and 10 for selectively supply the power from the power source for controlling power supply to the receivers 3 and 4 so that electric power may be supplied to only one of the receivers when the received electric field intensity is high and stable with no level drop. Therefore, power consumption in the portable radio communication device can be reduced.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodied within a scope encompassed and equivalents thereof with respect to the feature set out in the appended claims.

What is claimed is:

1. A diversity receiver comprising:
   first and second receivers having first and second antennas, respectively;
   electric field detection means for detecting first and second reception input electric field intensities of said first and second receivers, respectively;
   a power supply controller for turning on and off a power supply source to said first and second receivers in accordance with respective first and second power source control signals;
   control means for generating said first and second power source control signals, said control means including:
   means for generating a monitoring instruction signal for monitoring said first and second reception input electric field intensities;
   first comparing means for comparing said first reception input electric field intensity with a predetermined intensity to generate a first higher comparing signal when said first reception input electric field intensity is no less than said predetermined intensity;
   second comparing means for comparing said second reception input electric field intensity with said predetermined intensity to generate a second higher comparing signal when said second reception input electric field intensity is no less than said predetermined intensity;
   first and second monitoring counters for being set to an initial value in response to turning on said power supply source and for incrementing counting values in response to said first and second higher comparing signals, respectively, and generating respectively the second and first power source control signals for turning off the power supply source to one of said first and said second receivers when each value of said first and second monitoring counters, respectively, becomes a predetermined value.

2. A diversity receiver as set forth in claim 1, wherein said first comparing means generates a first lower comparing signal when said first reception input electric field intensity is lower than said predetermined intensity, and a second comparing means generates said second lower comparing signal when said second reception input electric field intensity is lower than said predetermined intensity, wherein said control means further comprises:
   means for generating said first and said second power source control signals for turning on said power supply source in response to said first and second lower comparing signals, respectively; and
   wherein said first and second monitoring counters are set to the initial value in response to sad first and second power source control signals for turning on said power supply source, respectively.

3. A diversity receiver as set forth in claim 1, wherein said first and second monitoring counters are reset to "0" in response to said first and second power source control signals for turning off said power supply source, respectively.

4. A diversity receiver as set forth in claim 1, wherein said diversity receiver comprises a portable radio communication device.

5. A diversity receiver as set forth in claim 1, wherein said first comparing means generates a first lower comparing signal when said first reception input electric field intensity is lower than said predetermined intensity.

6. A diversity receiver as set forth in claim 1, wherein said second comparing means generates a second lower comparing signal when said second reception input electric field intensity is lower than said predetermined intensity.

7. A diversity receiver as set forth in claim 1, wherein said control means further comprises means for generating said first and second power source control signals for turning on said power supply source in response to said first and second lower comparing signals, respectively.

8. A diversity receiver as set forth in claim 7, wherein said first and second monitoring counters are set to the initial value in response to said first and second power source control signals for turning on said power supply source, respectively.

9. A diversity receiver as set forth in claim 1, wherein said first and second monitoring counters are reset to a predetermined value in response to said first and second power source control signals for turning off said power supply source, respectively.

10. A diversity receiver as set forth in claim 1, wherein said diversity receiver comprises a radio communication device.

11. A method of controlling a diversity receiver to conserve power, comprising steps of:
    supplying power to a first receiver and to a second receiver;
    calculating a received signal strength for said first receiver;
    comparing said received signal strength for said first receiver to a threshold value;
    determining whether said received signal strength for said first receiver is a stable electric field,
    if said received signal strength for said first receiver is a stable electric field then turning off the power to said second receiver; and
    if said received signal strength for said first receiver is not a stable electric field then;
      calculating a received signal strength for said second receiver;
      comparing said received signal strength for said second receiver to said threshold value;
      determining if said received signal strength for said second receiver is a stable electric field, and
      if said received signal strength for said second receiver is a stable electric field then turning off the power to said first receiver;
    determining a time period of how long said signal strength is above said threshold value to determine whether a stable electric field exists, wherein said step of determining a time period comprises:
      resetting a counter when power is initially supplied to one of said first receiver and said second receiver;
      incrementing said counter when said received signal strength is above said threshold value; and
      comparing a count of said counter to a predetermined count, and judging that when said count equals said predetermined count, a stable electric field exits.

12. A method of controlling a receiver, comprising steps of:

supplying power to a first receiver and to a second receiver;

calculating a received signal strength for said first receiver;

comparing said received signal strength for said first receiver to a threshold value;

determining whether said received signal strength for said first receiver is a stable field, if said received signal strength for said first receiver is a stable field, then turning off the power to said second receiver; and if said received signal strength for said first receiver is not a stable field then:
  calculating a received signal strength for said second receiver;
  comparing said received signal strength for said second receiver to said threshold value;
  determining if said received signal strength for said second receiver is a stable field, and
  if said received signal strength for said second receiver is a stable field then turning off the power to said first receiver;

timing how long said signal strength is above said threshold value to determine whether a stable field exists, wherein said step of timing comprises:

resetting a counter when power is initially supplied to one of said first receiver and said second receiver;

incrementing said counter when said received signal strength is above said threshold value; and comparing a count of said counter to a predetermined count, and wherein when said count equals said predetermined count, a stable field is determined.

* * * * *